United States Patent [19]
Kettner et al.

[11] Patent Number: 5,252,281
[45] Date of Patent: Oct. 12, 1993

[54] APPARATUS AND METHOD FOR MANUFACTURE OF A MULTI-COLORED CLOSURE MEMBER OF A CLOSURE PROFILE

[75] Inventors: Catherine Kettner; Mladomir Tomic; Michael Kolosso, all of Appleton, Wis.

[73] Assignee: Reynolds Consumer Products Inc., Appleton, Wis.

[21] Appl. No.: 974,767

[22] Filed: Nov. 12, 1992

[51] Int. Cl.⁵ .............................................. B29C 47/04
[52] U.S. Cl. .................................... 264/171; 156/66; 264/177.10; 264/177.16; 425/131.1; 425/462
[58] Field of Search ............... 264/177.10, 177.16, 264/171; 425/131.1, 462; 156/66; 244.15, 244.25

[56] References Cited
U.S. PATENT DOCUMENTS

| | | | |
|---|---|---|---|
| 4,118,166 | 10/1978 | Bartrum | 425/462 |
| 4,285,105 | 8/1981 | Kirkpatrick | 24/201 C |
| 4,372,014 | 2/1983 | Simpson | 24/201 C |
| 4,540,537 | 9/1985 | Kamp | 425/131.1 |
| 4,787,880 | 11/1988 | Ausnit | 493/213 |
| 4,966,470 | 10/1990 | Thompson et al. | 383/61 |
| 5,060,848 | 10/1991 | Ewan | 229/102 |
| 5,066,444 | 11/1991 | Behr | 264/171 |
| 5,087,488 | 2/1992 | Cakmakci | 425/131.1 |
| 5,137,675 | 8/1992 | Rabe | 425/131.1 |

FOREIGN PATENT DOCUMENTS

| | | | |
|---|---|---|---|
| 2310207 | 5/1976 | France | 425/131.1 |
| 58-217335 | 12/1983 | Japan | 264/171 |
| 59-155014 | 9/1984 | Japan | 425/133.5 |

Primary Examiner—Jeffery Thurlow
Attorney, Agent, or Firm—Alan T. McDonald

[57] ABSTRACT

An apparatus for producing a multi-colored closure member of a closure profile includes a die plate for receiving melted materials having different colors at a die plate input port and extruding the closure member at a die plate output port. The apparatus further includes an adaptor module, connected to the die plate input face, for channeling each of the melted materials to a selected section of the die plate input port which corresponds to a specific portion of the closure member. The adaptor module includes an input face with separate input ports for receiving each of the melted materials, and an output face with output ports configured substantially in a form of specific portions of the closure member. A configuration of channels connects the adaptor module input ports to the adaptor module output ports. Each selected section of the die plate input port is fed by a corresponding adaptor module output port.

8 Claims, 2 Drawing Sheets

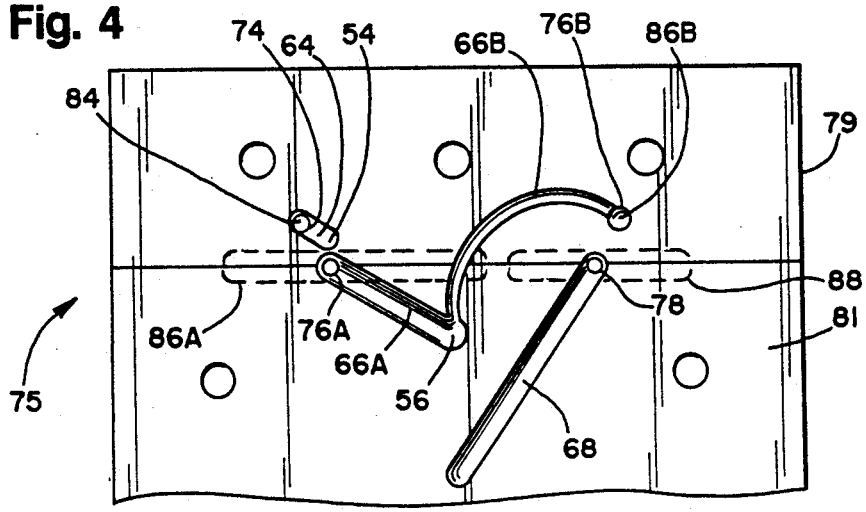
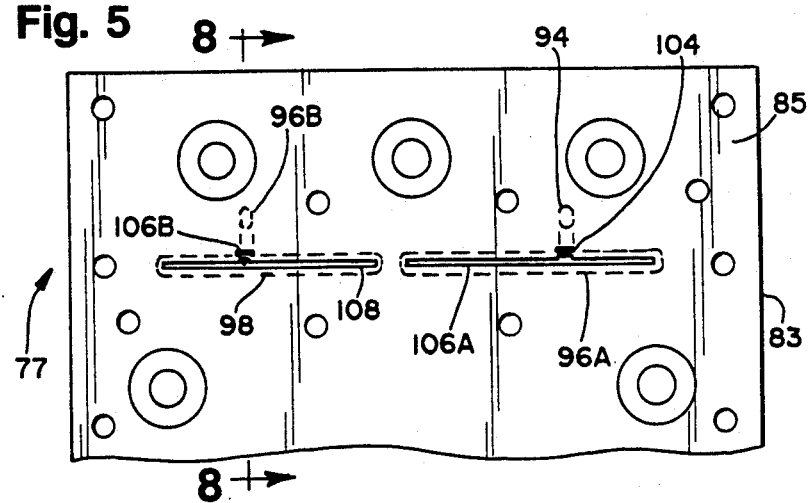
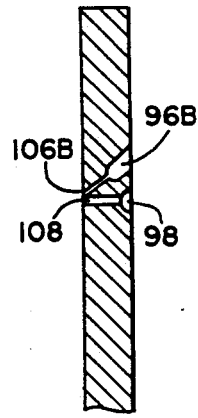
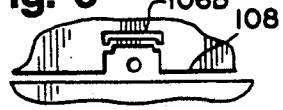
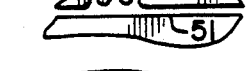
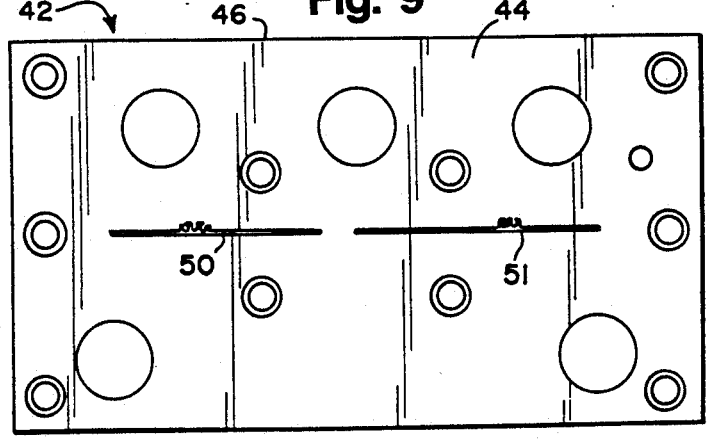

APPARATUS AND METHOD FOR MANUFACTURE OF A MULTI-COLORED CLOSURE MEMBER OF A CLOSURE PROFILE

BACKGROUND OF THE INVENTION (a) Field of the Invention

The present invention generally relates to an apparatus and method for producing a closure member of a closure profile. More particularly, the invention relates to an apparatus and method for producing a first multi-colored closure member adapted to interlock with a second multi-colored closure member, where color interaction among specific portions of the closure members reveals imperfections in closure.

(b) Description of the Prior Art

In recent years, there has been an increase in the use of recloseable bags for preserving or storing such items as food. Some of these stored items require a tightly sealed bag to prevent leakage of the bag's contents. The seal of the bag will hereinafter be referred to as the closure profile of the bag. The closure profile typically includes two closure members which interlock with each other to seal the bag. In order for the bag to be tightly sealed, its closure members must be completely interlocked over the entire length of the bag's mouth. Where the closure members are of the same color (e.g., clear or white), a person can only insure that there is a tight seal by making a physical check of the interlocked closure members. Often, a person can be confident that a tight seal has been obtained only by running his/her hand across the closure profile many times.

One bag used in recent years has two closure members of different colors. The bag uses a color change to indicate that the closure members are properly interlocked. For example, some recloseable bags presently marketed have a yellow closure member and a blue closure member which result in a green color along the closure profile when the bag is sealed. Although the colored closure members make it easy to line up the two closure members before interlocking them, the color change upon interlocking the closure members does not readily reveal an imperfect closure. For instance, if the closure members are yellow and blue and the closure is imperfect, the entire length of the closure profile will still appear green except upon extremely close visual examination. Only a physical check ensures that the two closure members are completely interlocked.

One type of colored interlocking closure device is described and illustrated in U.S. Pat. No. 4,285,105 to Kirkpatrick. The Kirkpatrick patent discloses the use of different colors for the two closure members so that one can observe the completeness of the occlusion of the closure. An illustrative embodiment disclosed by the Kirkpatrick patent is that the closure members can be primary colors and sufficiently translucent (e.g., red and yellow) so that occlusion of the closure numbers produces a visible secondary color (e.g., orange).

While the use of different colors for the two closure members has been used extensively in recent years, it does not allow for simple visual verification of complete occlusion of the closure members. People must still run their hands across the length of the closure profile more than once to insure that there is a tight seal. Consequently, a need exists for improvement in the design of the closure profile so that complete occlusion of the closure members can be easily visually verified.

The closure profile of recloseable bags presently on the market have monochromatic closure members, where one closure member is all one color and the other closure member is all the same or another color. The apparatus for producing a closure profile of a recloseable bag is relatively simple in design. The apparatus typically consists of an adaptor plate and a die plate connected to the adaptor plate. To produce a closure profile with two closure elements of the same color, a single melted material is first fed into an input port in the die plate. The melted material then flows through one or two channels in the die plate and leaves the die plate approximately in the form of each of the closure members. If each of the closure members is being extruded through separate output ports in the die plate, the die plate will contain two channels, one for extruding one closure member and the other for extruding the other closure member. If the two closure members are being extruded through a single output port through the die plate and cut apart later on, the die plate contains a single channel which extrudes both closure members together.

To produce a closure profile with the two closure members being of different colors, two melted materials having different colors are fed through two input ports in the die plate. The die plate has two separate channels cut through it, one for each color, with each channel producing one of the closure members.

Since a closure profile with monochromatic closure members does not allow for easy visual verification of proper closure, a need exists for a new and useful closure profile with improved color interaction among its two closure members. In addition, a need exists for an apparatus which can produce such a new and useful closure profile.

SUMMARY OF THE INVENTION

The present invention provides an apparatus and method for producing a multi-colored closure member of a closure profile which is designed to satisfy the aforementioned needs. As previously stated, the prior art attempted to make the locking of a closure visually evident by a color change along the closure profile produced by bringing two closure members of different colors together. In the prior art, an imperfect closure is difficult to visually detect because the color change results even if the two closure members are in close proximity to one another, but not interlocked. This problem can be overcome by indicating an imperfect closure through the use of color masking. Color interaction among the closure members enables a user to detect easily a misaligned or unmated profile visually without administering physical checks. This color interaction is achieved by use of a multi-colored closure member.

Instead of cutting a single channel through a die plate to produce a single closure member, the multi-colored closure member produced by the present invention requires the use of an adaptor module. The adaptor module has a configuration of channels which direct melted materials having different colors to different output ports on the adaptor module with each of the output ports producing a specific portion of the closure member. An advantage of the apparatus of the present invention is that the adaptor module can be reconfigured to allow one to vary the arrangement and number of colors in the closure member and to allow one to direct a specific color to a specific portion of the closure member without cutting a new die plate. After determining the number of differently-colored portions desired in the closure member of the closure profile, the adaptor module can be designed to channel a melted material of the appropriate color to the adaptor module output port which will eventually produce the portion of the closure member having that color. Unlike the prior art which discloses an apparatus which only can produce monochromatic closure members, the present invention includes an apparatus which can produce a multi-colored closure member.

The closure profile produced by the apparatus and method of the present invention includes a first closure member having a first closure element with a first portion being of a first color. The closure profile also includes a second closure member having a second closure element with a second portion being of a second color. The second closure element is adapted for being interlocked continuously with the first closure element over a predetermined length. To indicate whether a perfect closure has been achieved along the predetermined length, the first color is apparent where the closure elements are properly interlocked, but the first color is substantially masked by the second color where the closure elements are not properly interlocked. Such masking allows for easy visual verification of correct mating.

More specifically, each of the two closure elements includes a locking member with a locking tip, each of the locking tips being of different colors. Furthermore, each of the closure members includes a web portion having a base integrally connected to the web portion and flange portions on the base. The aforementioned arrangement results in a color being apparent along the predetermined length where the locking tips are properly interlocked, and the color being substantially masked by the other color where the locking tips are not properly interlocked.

Accordingly, the present invention relates to an apparatus and method for producing a multi-colored closure member of a closure profile. The apparatus includes a die plate with an input port for receiving melted materials of different colors, an output port for extruding the melted materials in the form of the closure member, and a uniform channel extending from the input port to the output port. The input port, output port, and uniform channel are shaped in the form of the closure member. The apparatus further includes an adaptor module for channeling each of the melted materials to a selected section of the die plate input port.

More specifically, the adapter module has an input face with separate input ports for receiving each of the melted materials, an output face with output ports configured substantially in a form to direct the melted materials to produce specific portions of the closure member, and a configuration of channels connecting the input ports to the output ports. The adapter module output face is connected to the die plate input face such that each selected section of the die plate input port is fed by a corresponding adaptor module output port. Each of the melted materials is directed through the adapter module to the output port corresponding to the selected section of the die plate input port. Since the die plate input port is shaped in the form of the closure member, each selected section of the die plate input port corresponds to a specific portion of the closure member which is extruded from the output face of the die plate. The closure member may include such specific portions as a web portion, a base of the web portion, a flange of the web portion, a post of a closure element, a post tip of the post, a locking member of the closure element, and a locking tip of the locking member.

BRIEF DESCRIPTION OF THE DRAWINGS

The advantages of the present invention will become apparent upon reading the following detailed description and upon reference to the accompanying drawings, in which:

FIG. 4 is a plan view of the input and output faces of an adapter plate of an adapter module of the apparatus shown in FIGS. 2 and 3;

FIG. 5 is a plan view of the output and input faces of a feeder plate of the adapter module of the apparatus shown in FIGS. 2 and 3;

FIG. 6 is an enlarged view of an output port on the output face of the feeder plate shown in FIG. 5;

FIG. 7 is an enlarged view of another output port on the output face of the feeder plate shown in FIG. 5;

FIG. 8 is a cross-sectional view of the feeder plate shown in FIG. 5 taken along the line 8—8; aid FIG. 9 is a plan view of the input face of a die plate of the apparatus shown in FIG. 2;

FIG. 10 is an enlarged view of one portion of the input face of the die plate shown in FIG. 9; and FIG. 11 is an enlarged view of another portion of the input face of the die plate shown in FIG. 9.

DESCRIPTION OF THE PREFERRED EMBODIMENT

The present invention relates to an apparatus and method for producing a multi-colored closure member of a closure profile. Since the primary advantage of multi-colored closure members is to reveal imperfect closure through color masking, an illustration showing color masking among two multi-colored closure members of a closure profile will first be described.

Figure 1:
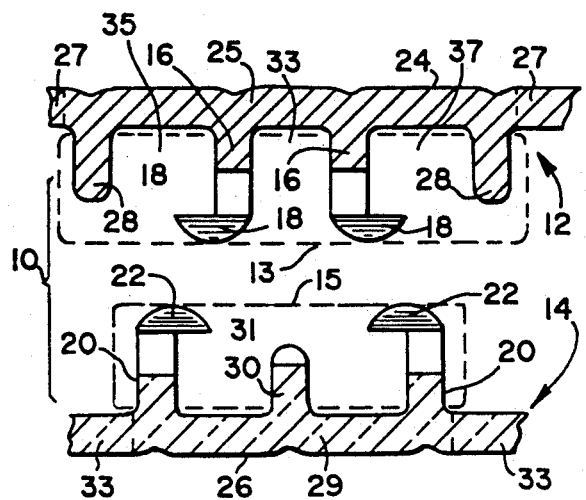
FIG. 1 is an enlarged cross-sectional view of the closure profile produced by the present invention.

Referring now to the drawings, and more particularly to FIG. 1, there is shown a closure profile, generally designated by the reference numeral 10. The closure profile 10 includes a first closure member generally designated by the reference numeral 12, and a second closure member generally designated by the reference numeral 14. The first closure member 12 includes a first closure element 13, and the second closure member 14 includes a second closure element 15 which is adapted for being interlocked continuously with the first closure element 13 over a predetermined length. Each of the closure elements 13 and 15 is partially colored, with the color of the first closure element 13 being different from the color of the second closure element 15. The color on the first closure element 13 is visible along the predetermined length where the closure elements 13 and 15 are properly interlocked, while the color on the first closure element 13 is substantially masked by the color on the second closure element 15 where the closure elements 13 and 15 are not properly interlocked.

In one embodiment of the closure profile 10, the first closure member 12 includes a first web portion 24 having a first base 25 integrally connected to the first closure element 13 and flange portions 27 on the first base 25. The first closure element 13 has a first pair of locking members 16 with locking tips 18, the locking tips 18 being of a first color. The first closure element 13 also includes a pair of posts 28 which are integrally connected to the first base 25 and protrude therefrom approximately parallel and in the same direction as the first pair of locking members 16. The pair of posts 28 are located opposite one another with the first pair of locking members 16 between them. In the illustrated embodiment, the entire first web 24, the pair of posts 28, and the first pair of locking members 16 (with the exception of the locking tips 18) are of a second color.

The second closure member 14 includes a second web portion 26 having a second base 29 integrally connected to the second closure element 15 and flange portions 33 on the second base 29. The second closure element 15 has a second pair of locking members 20 with locking tips 22, the locking tips 22 being of the second color. The second closure element 15 also includes a post 30 with a tip 31 being of the second color. The post 30 is integrally connected to the second base 29 and protrudes therefrom approximately parallel and in the same direction as the second pair of locking members 20. The post 30 is located between the second pair of locking members 22. With the exception of the locking tips 22 and the post tip 31, the remainder of the second closure member 14 is preferably of a clear colored melted material. Having a clear colored melted material allows a user to view the first and second closure elements 13 and 15 through the second web portion 26.

The first closure element 13 interlocks with the second closure element 15 through the mating of opposing parts. The first pair of locking members 16 contain a gap 33 between them which is adapted to receive the post 30 of the second closure element 15. Similarly, the first pair of locking members 16 and the pair of posts 28 form spaces 35 and 37 between them which are adapted to receive the second pair of locking members 20. The first pair of locking members 16 interlock with the second pair of locking members 20 in a snapping action caused by bringing the locking tips 18 of the first pair of locking members 16 passed the locking tips 22 of the second pair of locking members 20. Due to the arrangement of colors in the closure profile 10, the first color on the locking tips 18 of the first pair of locking members 16 is apparent to a viewer looking through the second web portion 26 when the first and second closure elements 13 and 15 are properly interlocked. The first color, however, is substantially masked by the second color of the locking tips 22 of the second pair of locking members 20 when the first and second closure elements 13 and 15 are not properly interlocked.

Figure 2:
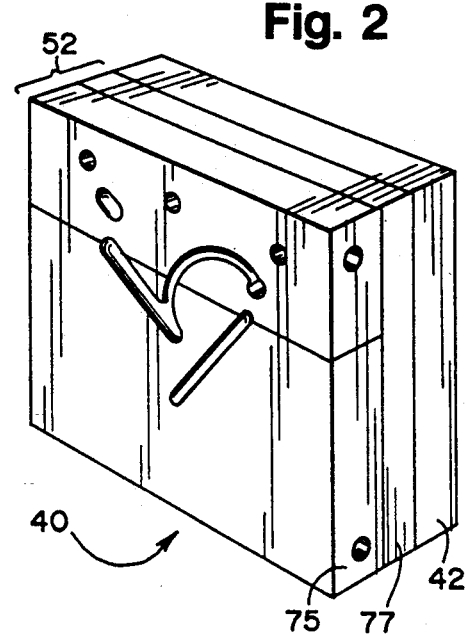
FIG. 2 is a perspective view of an apparatus for producing a multi-colored closure member of a closure profile.

Referring next to FIG. 2, there is shown an apparatus, generally designated by the reference numeral 40, for producing a multi-colored closure member of a closure profile. The apparatus 40 includes an adapter module 52, consisting of an adapter plate 75 connected to a feeder plate 77, and a die plate 42. Melted materials having different colors are inputted at separate input ports on the adapter plate 75, directed through the adapter module 52 and the die plate 42, and ultimately extruded from the die plate 42 in the form of two multicolored closure members of a closure profile.

Figure 3:
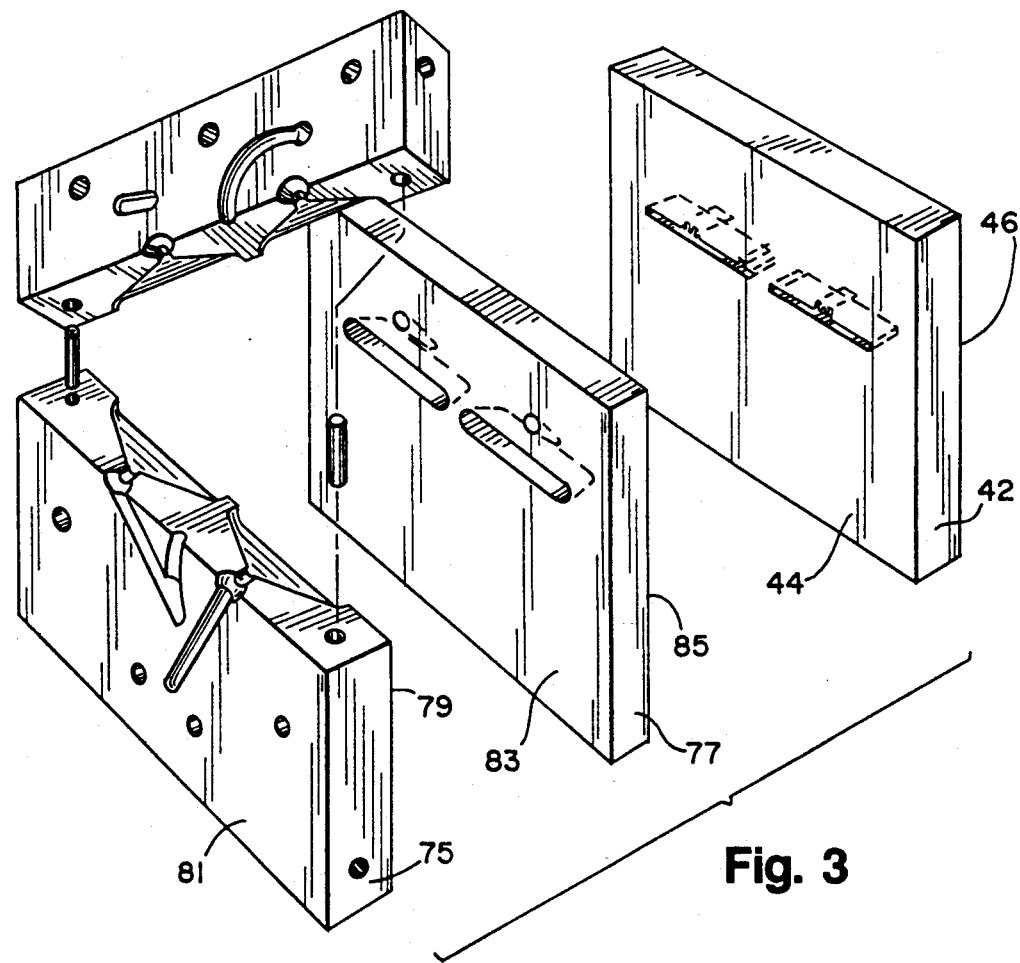
FIG. 3 is a perspective view of the apparatus shown in FIG. 2 with an adaptor plate, feeder plate, and die plate shown separated from one another.

Referring to FIG. 3, the adaptor plate 75, the feeder plate 77, and the die plate 42 are shown separated from one another. An internal view of the plates is denoted by the dotted lines. The adaptor plate 75 is shown in two parts to give a better understanding of its internal configuration.

The adapter plate 75, the feeder plate 77, and the die plate 42 are illustrated in more detail in FIGS. 4, 5 and 9, respectively. The solid lines on the FIGS. 4, 5 and 9 show the configuration seen when looking directly at the visible face of the illustrated plate, while the dotted lines represent the configuration on the hidden nonvisible face of the plate.

Referring to FIG. 4, the adapter plate 75 includes an input face 81 and an output face 79. The configuration on the input face 81 is denoted by solid lines, while the configuration on the output face 79 is denoted by dotted lines. The input face 81 has separate input ports 54, 56, and 58 for receiving melted materials of different colors. The melted materials flow through feed grooves 64, 66A, 66B, and 68 cut into the input face 81 and enter the adapter plate 75 at channels 74, 76A, 76B, and 78. The channels 74, 76A, 76B, and 78 connect the input ports 54, 56, and 58 to output ports 84, 86A, 86B, and 88 on the output face 79 of the adapter plate 75. Although the adapter plate 75 does not shape the melted materials in the form of two closure members of a closure profile, the adapter plate 75 does spread out the flow of the melted materials to different areas in preparation for producing the two closure members of the closure profile.

Referring next to FIG. 5, there is shown the feeder plate generally designated by the reference numeral 77. The feeder plate 77 includes an input face 83 and an output face 85. The configuration on the input face 83 is represented by the dotted lines, while the configuration on the output face 85 is represented by the solid lines. The feeder plate input face 83 is connected to the adapter plate output face 79. The input face 83 has input ports 94, 96A, 96B, and 98 which are the same shape as the adapter plate output ports 84, 86A, 86B and 88, respectively. The feeder plate input ports 94, 96A, 96B, and 98 are positioned on the feeder plate input face 83 to mate with the adapter plate output ports 84, 86A, 86B, and 88, respectively. As a result, melted materials are fed directly from the adapter plate output ports 84, 86A, 86B, and 88 into the feeder plate input ports 94, 96A, 96B, and 98, respectively.

The output face 85 of the feeder plate 77 has output ports 104, 106A, 106B, and 108 which correspond to the feeder plate input ports 94, 96A, 96B, and 98, respectively. Since the function of the feeder plate 77 is to shape the different colored melted materials substantially into the form of two closure members, the feeder plate output ports 104, 106A, 106B, and 108 are approximately shaped in the form of specific portions of the two closure members. Melted materials having different colors are channeled from the feeder plate input ports 94, 96A, 96B, and 98 to the feeder plate output ports 104, 106A, 106B, and 108, respectively. FIG. 8, a cross-sectional view of FIG. 5 taken along the line 8—8, shows how the melted materials are channeled through the feeder plate 77 from the input ports 96B and 98 to the output ports 106B and 108.

FIGS. 6 and 7 illustrate enlarged views of the feeder plate output ports 106B and 104. Referring to FIGS. 1 and 7, the feeder plate output port 104 is shaped substantially in the form of the locking tips 18 of the first pair of locking members 16 of the first closure member 12. Referring to FIGS. 1 and 7, the feeder plate output port 106A is shaped substantially in the form of the remainder of the first closure member 12. Referring to FIGS.

1 and 6, the feeder plate output port 106B is shaped substantially in the form of the locking tips 22 of the second pair of locking members 20 and of the posts tips 31 of the post 30 of the second closure member 14. Finally, the feeder plate output port 108 is shaped substantially in the form of the remainder of the second closure member 14. Thus, the melted materials flow out of the feeder plate output face 85 substantially in the form of the specific portions of the two closure members of the closure profile, but each of the two closure members is not yet one integral piece.

Referring to FIG. 9, there is shown a die plate generally designated by the reference numeral 42. The die plate 42 includes an input face 44 having input ports 50 and 51, an output face 46 having output ports (not shown), and a uniform channel extending from the input ports 50 and 51 to the output ports. Since the configuration of the output face 46 is identical to the configuration of the input face 44, only the input face 44 is shown in FIG. 9. The die plate output ports are identical in shape to the input ports 50 and 51. An enlarged view of the input ports 50 and 51 is shown by the FIGS. 11 and 10, respectively.

Referring to FIGS. 1, 10 and 11, the input port 50 is shaped in the form of the first closure member 12, while the input port 51 is shaped in the form of the second closure members 14. Selected sections of the input ports 50 and 51 correspond to specific portions of the first and second closure members 12 and 14, and these selected sections are fed by corresponding feeder plate output ports. The selected section of the input port 50 corresponding to the locking tips 18 of the first closure member 12 is fed by the feeder plate output port 104. The selected section of the input port 50 corresponding to the remainder of the first closure member 12 is fed by the feeder plate output port 106A. The selected section of the input port 51 corresponding to the locking tips 22 and the post tip 31 of the second closure member 14 is fed by the feeder plate output port 106B. Finally, the selected section of the input port 51 corresponding to the remainder of the second closure member 14 is fed by the feeder plate output port 108. Thus, beginning at the die plate input ports 50 and 51, melted materials having different colors are brought together in the die plate to form the first and second closure members 12 and 14. The die plate 42 functions to keep the melted materials in the form of the closure members 12 and 14 for the width of the die plate 42.

Melted materials having different colors pass through the adapter plate 75, the feed plate 77, and the die plate 42 to form the first and second closure members 12 and 14 as follows. Referring first to FIG. 4, a melted material having a first color is fed into the input port 54, a melted material having a second color is fed into the input port 56, and a melted material having a clear color is fed into the input port 58. The melted material of the first color flows through the feed groove 64 cut into the input face 81 and enters the adapter plate 75 at the channel 74. The melted material of the second color is split into two parts. A first part of the melted material flows through the straight feed groove 66A and enters the adapter plate 75 at the channel 76A. The second part of the melted material of the second color flows through the curved feed groove 66B and enters the adapter plate 75 at the channel 76B. The melted clear material flows through the feed groove 68 and enters the adapter plate 75 at the channel 78.

Next, the melted materials pass through the channels 74, 76A, 76B, and 78 and exit the adapter plate 75 at the output ports 84, 86A, 86B, and 88, respectively. The melted material of the first color exits the adapter plate 75 through the output port 84, the first part of the melted material of the second color exits through the output port 86A, the second part of the melted material of the second color exits through the output port 86B, and the melted clear material exits through the output port 88.

Referring now to FIG. 5, the melted materials exiting from the adapter plate output ports 84, 86A, 86B, and 88 are fed directly into the feeder plate input ports 94, 96A, 96B, and 98. The melted material of the first color is fed into the input port 94, the first part of the melted material of the second color is fed into the input port 96A, the second part of the melted material of the second color is fed into the input port 96B, and the melted clear material is fed into the input port 98.

After entering into the input ports 94, 96A, 96B, and 98, the melted materials having different colors pass through the feeder plate and exit at the output ports 104, 106A, 106B, and 108, respectively. The output port 104, through which the melted material of the first color exits, is shaped substantially in the form of the locking tips 18 of the first closure member 12 shown in FIG. 1. The output port 106A, through which the first part of the melted material of the second color exits, is shaped substantially in the form of the remainder of the first closure member 12. The output port 106B, through which the second part of the melted material of the second color exits, is shaped substantially in the form of the locking tips 22 and the post tip 31 of the second closure member 14. Finally, the output port 108, through which the melted clear material exits, is shaped substantially in the form of the remainder of the second closure member 14.

Referring lastly to FIG. 9, the melted materials are fed from the feeder plate output ports 104, 106A, 106B, and 108 into the die plate input ports 50 and 51. The feeder plate output ports 104 and 106A feed the die plate input port 50. The melted material of the first color and the first part of the melted material of the second color come together at the die plate input port 50 to form the first closure member 12 shown in FIG. 1. The feeder plate output ports 106B and 108 feed the die plate input port 51. The second part of the melted material of the second color and the melted clear material come together at the die plate input port 51 to form the second closure member 14 shown in FIG. 1. Since the configuration of the die plate 42 remains the same from the input face 44 to the output face 46, the melted materials exit the die plate 42 in the form of the first and second closure members 12 and 14 shown in FIG. 1.

The melted materials used by the apparatus of the present invention may be composed of polyethylene, polypropylene, nylon, any other flexible thermoplastic material, or a combination of the aforementioned materials. In addition, by changing the configuration of the adapter plate 75 and the feeder plate 77, the arrangement and number of colors in the first and second closure members 12 and 14 in FIG. 1 can be changed. For example, one could reconfigure the adapter plate 75 and the feeder plate 77 to form the first closure member 12 out of a melted clear material (except for the locking tips 18) instead of a melted material of a color.

It is believed that the apparatus and method for producing a multi-colored closure member of a closure profile and their attendant advantages will be understood from the foregoing description. It will be apparent that various changes may be made in the form, construction and arrangement of the parts thereof without departing form the spirit and scope of the invention or sacrificing all of its material advantages, the form hereinbefore described being merely a preferred or exemplary embodiment thereof.

We claim:

1. An apparatus for producing a multi-colored closure member of a closure profile, comprising:
    a die plate including an input face with an input port for receiving melted materials as separate streams, each of the melted materials having a different color, an output face with an output port for extruding the melted materials as a single stream in a form of the closure member of the closure profile, and a uniform channel extending from the input port to the output port for merging said separate streams into said single steam, both the input port and the output port being shaped in the form of the closure member; and
    means for channeling each of the melted materials as a separate stream to a selected section of the input port, each of the selected sections producing a specific portion of the multi-colored closure member.

2. The apparatus as recited in claim 1, wherein the means for channeling each of the melted materials as a separate stream includes an adaptor module having
    an input face with separate input ports for receiving each of the melted materials,
    an output face with outputs ports configured substantially in a form of specific portions of the closure member, the adaptor module output face connected to the die plate input face such that each selected section of the die plate input port is separately fed by a corresponding adaptor module output port, and
    a configuration of channels, connecting the adaptor module input ports to the adaptor module output ports, which direct each of the melted materials to the adaptor module output port corresponding to the selected section of the die plate input port as a separate stream.

3. The apparatus as recited in claim 1, wherein each of the melted materials are separately channeled to the selected section of the die plate input port, producing the specific portion of the multi-colored closure member selected from the group consisting of a web portion, a base of the web portion, a flange of the web portion, a post of a closure element, a post tip of the closure element, a locking member of the closure element, and a locking tip of the locking member of the closure element.

4. The apparatus as recited in claim 3, wherein a first melted material is channeled to the selected section of the die plate input port producing the locking tip of the locking member, and a second melted material is channeled to the selected section of the die plate input port producing the base of the web portion.

5. The apparatus as recited in claim 3, wherein a first melted material is channeled to the selected section of the die plate input port producing the locking tip of the closure element, and a second melted material is channeled to the selected section of the die plate input port producing the remainder of the closure element and the web portion.

6. The apparatus as recited in claim 3, wherein a first melted material is channeled to the selected section of the die plate input port producing the locking tip of the closure element and the post tip of the closure element, and a second melted material is channeled to the selected section of the die plate input port producing the remainder of the closure element and the web portion.

7. A method of producing a multi-colored closure member of a closure profile, comprising the steps of:
    (a) providing a least two melted materials to an extrusion die as separate streams, each of the melted materials having a different color; and
    (b) merging and extruding the separate streams of the melted materials along a uniform channel in said extrusion die to form a first closure member.

8. The method as recited in claim 7, wherein step (b) includes merging and extruding a first melted material of a first color to form a first portion of the first closure member, and merging and extruding a second melted material of a second color different from said first color to form a second portion of the first closure member.

* * * * *